United States Patent
Kim

(10) Patent No.: US 10,353,430 B2
(45) Date of Patent: Jul. 16, 2019

(54) WEARABLE DEVICE AND ELECTRONIC APPARATUS

(71) Applicant: SAMSUNG ELECTRONICS CO., LTD., Suwon-si (KR)

(72) Inventor: Dongkyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/009,775

(22) Filed: Jun. 15, 2018

(65) Prior Publication Data

US 2019/0041900 A1 Feb. 7, 2019

(30) Foreign Application Priority Data

Aug. 7, 2017 (KR) .................. 10-2017-0099611

(51) Int. Cl.
  *G06F 1/16* (2006.01)
  *G06K 9/00* (2006.01)
  *G06F 3/041* (2006.01)

(52) U.S. Cl.
  CPC ............ *G06F 1/163* (2013.01); *G06F 1/1637* (2013.01); *G06F 1/1656* (2013.01); *G06F 3/041* (2013.01); *G06F 2203/04102* (2013.01); *G06K 9/0002* (2013.01)

(58) Field of Classification Search
  CPC ...... G06F 1/163; G06F 1/1656; G06F 1/1643; G06F 1/1637; G06F 3/041; G06F 2203/04102; G06K 9/0002; H05K 5/0017; H05K 2201/10128; G02F 1/13452
  See application file for complete search history.

(56) References Cited

U.S. PATENT DOCUMENTS

| 9,872,408 | B2 | 1/2018 | Choi et al. |
| 9,930,799 | B2 | 3/2018 | Moon et al. |
| 2003/0107487 | A1 | 6/2003 | Korman et al. |
| 2006/0262241 | A1* | 11/2006 | Jeong .................. H05K 5/0247 349/58 |
| 2011/0221688 | A1* | 9/2011 | Byun ..................... H04B 1/385 345/173 |
| 2013/0279303 | A1 | 10/2013 | Kaltenrieder et al. |
| 2014/0139422 | A1* | 5/2014 | Mistry ................... G06F 3/014 345/156 |

(Continued)

FOREIGN PATENT DOCUMENTS

| EP | 2 477 084 A1 | 7/2012 |
| EP | 2 853 960 A2 | 4/2015 |

(Continued)

OTHER PUBLICATIONS

Communication dated Jan. 4, 2019, issued by the European Patent Office in counterpart European Application No. 18186114.7.

*Primary Examiner* — Abhishek M Rathod
(74) *Attorney, Agent, or Firm* — Sughrue Mion, PLLC

(57) ABSTRACT

Provided are a wearable device and an electronic apparatus, the wearable device including a waterproof member. The wearable device includes a window member having a bent structure. The waterproof member is disposed in the bent window member, thereby preventing a space into which water may leak and providing a wearable device in which a flexible connector passes through the waterproof member and is connected to a driving module below the flexible connector.

21 Claims, 14 Drawing Sheets

(56) References Cited

U.S. PATENT DOCUMENTS

| | | | | |
|---|---|---|---|---|
| 2014/0169033 A1* | 6/2014 | Yu | ................. | H05K 7/20409 |
| | | | | 362/611 |
| 2014/0362544 A1 | 12/2014 | Han et al. | | |
| 2015/0245513 A1* | 8/2015 | Moon | ................. | G06F 1/20 |
| | | | | 361/679.01 |
| 2016/0109861 A1 | 4/2016 | Kim et al. | | |
| 2016/0147264 A1* | 5/2016 | Kil | ................. | G06F 1/1626 |
| | | | | 345/173 |
| 2016/0254587 A1* | 9/2016 | Jung | ................. | H01Q 1/273 |
| | | | | 343/702 |
| 2016/0291745 A1* | 10/2016 | Grip | ................. | G04G 21/08 |

FOREIGN PATENT DOCUMENTS

| | | |
|---|---|---|
| KR | 10-2004-0072648 A | 8/2004 |
| KR | 10-2015-0112208 A | 10/2015 |
| KR | 10-2016-0030821 A | 3/2016 |
| KR | 10-2016-0105269 A | 9/2016 |
| KR | 10-2016-0129343 A | 11/2016 |
| KR | 10-2017-0040082 A | 4/2017 |

\* cited by examiner

WEARABLE DEVICE AND ELECTRONIC APPARATUS

CROSS-REFERENCE TO RELATED APPLICATION

This application claims priority from Korean Patent Application No. 10-2017-0099611, filed on Aug. 7, 2017 in the Korean Intellectual Property Office, the disclosure of which is incorporated herein in its entirety by reference.

BACKGROUND

1. Field

One or more exemplary embodiments relate to a wearable device that can be worn on a part of a body, and a portable electronic apparatus.

2. Description of the Related Art

Various wearable devices and various portable terminals such as smart watches and smartphones are available in the market. The wearable devices and the portable terminals may be easily exposed to foreign materials in external environments. Accordingly, there is a demand for protecting the wearable devices and portable electronic apparatuses (or portable terminals) against the foreign materials in the external environments. For example, there is a demand for waterproof and/or dustproof functions for the wearable devices and portable electronic apparatuses.

SUMMARY

According to an aspect of an exemplary embodiment, there is provided a wearable device that is wearable by a user, including: a display; a window member disposed on or above the display in a first direction, the window member including a first window member, and a second window member configured to interlock with a first groove formed on a lateral portion of the first window member; a sensor disposed on or above the window member in the first direction; a driving module disposed on or below the display in the first direction; a flexible connector, disposed between the first window member and the second window member, and configured to electrically connect the sensor and the driving module; a waterproof member surrounding an edge portion of the window member and being elastically deformable; a case including an insertion hole into which the sensor and the display are insertable; and at least one strap connected to the case.

The first window member and the second window member may interlock with each other and form a cylindrical shape.

A surface of the lateral portion of the first window member facing the second window member may include a first surface having a curved form, a second surface having a planar form, and a third surface having the curved form, the second surface being between the first surface and the third surface.

The lateral portion of the first window member may further include a first bent portion and a second bent portion extending in a radial direction of the first window member, and the first groove may include a first bent groove formed by the first bent portion and the first surface and a second bent groove formed by the second bent portion and the third surface.

A second groove may be formed on the second surface and the flexible connector is seated on the second groove.

A surface of the second window member facing the surface of the first window member may include a fourth surface having the curved form, a fifth surface having the planar form, and a sixth surface having the curved form.

The second window member may further include a third bent portion and a fourth bent portion extending in a radial direction of the first window member, and the first groove may include a third bent groove formed by the third bent portion and the fourth surface and a fourth bent groove formed by the fourth bent portion and the sixth surface.

A second groove may be formed on the fifth surface and the flexible connector is seated on the second groove.

The sensor may include at least one from among a fingerprint sensor, a touch sensor, and a touch and fingerprint sensor.

The wearable device may include a first adhesive film between the second window member and the flexible connector.

The wearable device may include a second adhesive film between the first window member and the flexible connector.

The case may surround an edge portion of the waterproof member, and accommodate the driving module, the display, the sensor, the first window member, and the second window member.

The wearable device may include a glass cover disposed on or over the sensor.

According to an aspect of another exemplary embodiment, there is provided an electronic apparatus, including: a display; a window member disposed on or above the display in a first direction, the window member including a first window member, and a second window member configured to interlock with a first groove formed on a lateral portion of the first window member; a sensor disposed on or above the window member in the first direction; a driving module disposed on or below the display in the first direction; a flexible connector disposed between the first window member and the second window member, and configured to electrically connect between the sensor and the driving module; and a waterproof member configured to surround an edge portion of the window member and being elastically deformable.

A surface of the first window member facing the second window member may include a first surface having a planar form and extending in the first direction.

A second groove may be formed on the first surface and the flexible connector may be seated on the second groove.

A surface of the second window member facing the surface of the first window member may include a second surface having the planar form and extending in the first direction.

A second groove may be formed on the second surface and the flexible connector may be seated on the second groove.

The electronic apparatus may further include a first adhesion film between the second window member and the flexible connector.

The electronic apparatus may further include a second adhesion film between the first window member and the flexible connector.

According to an aspect of another exemplary embodiment, there is provided an electronic apparatus, including: a display; a window member disposed on or above the display in a first direction, the window member including a first window member, and a second window member that is interlocked with the first window member in a lateral direction of the first window member; a sensor disposed on or above the window member in the first direction; a driving module configured to drive the sensor, and disposed on or below the display in the first direction; a flexible connector, disposed between the first window member and the second window member in the lateral direction of the first window member, and configured to electrically connect the sensor and the driving module; a waterproof member configured to surround an edge portion of the window member.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
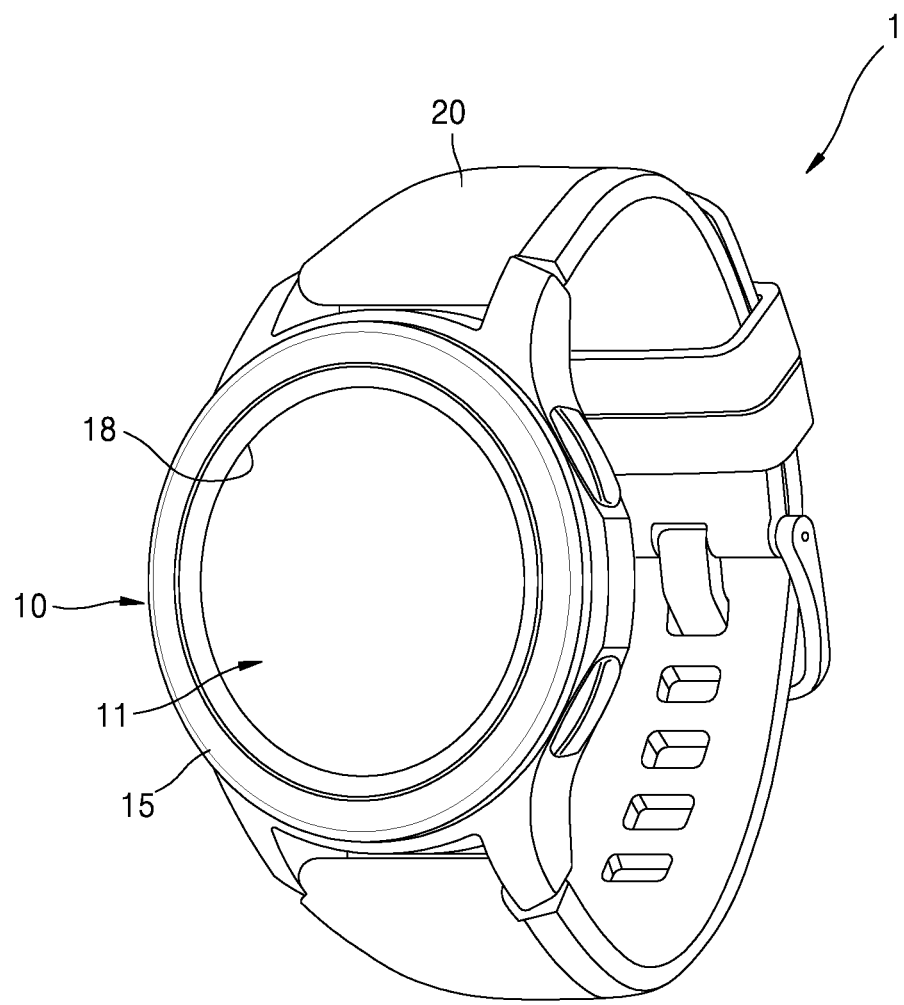
FIG. 1 is a perspective view of a wearable device according to an exemplary embodiment.

Hereinafter, the exemplary embodiments will be described in detail with reference to the attached drawings. Like reference numerals in the drawings denote like components, and thus their description will be omitted.

The attached drawings for illustrating exemplary embodiments are referred to in order to gain a sufficient understanding of the effects and features thereof, and methods for accomplishing the effects and features thereof. However, this is not intended to limit the disclosure to particular modes of practice, and it is to be appreciated that all changes, equivalents, and substitutes that do not depart from the spirit and technical scope are encompassed in the disclosure.

It will be understood that although the terms "first", "second", etc. may be used herein to describe various components, these components should not be limited by these terms. These components are only used to distinguish one component from another.

As used herein, the singular forms "a", "an", and "the" are intended to include the plural forms as well, unless the context clearly indicates otherwise.

It will be further understood that the terms "comprises," or "comprising," "includes," and/or "including" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following exemplary embodiments are not limited thereto.

Figure 2:
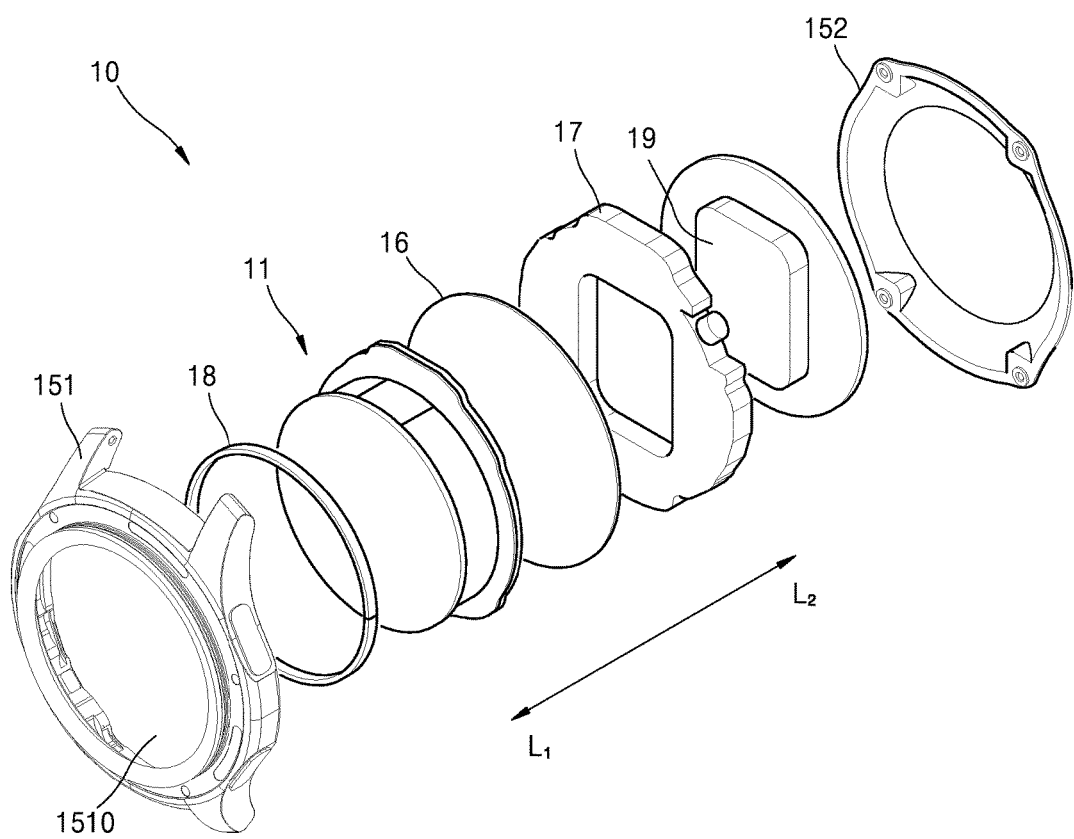
FIG. 2 is an exploded perspective view of a wearable device according to an exemplary embodiment.
Figure 3A:
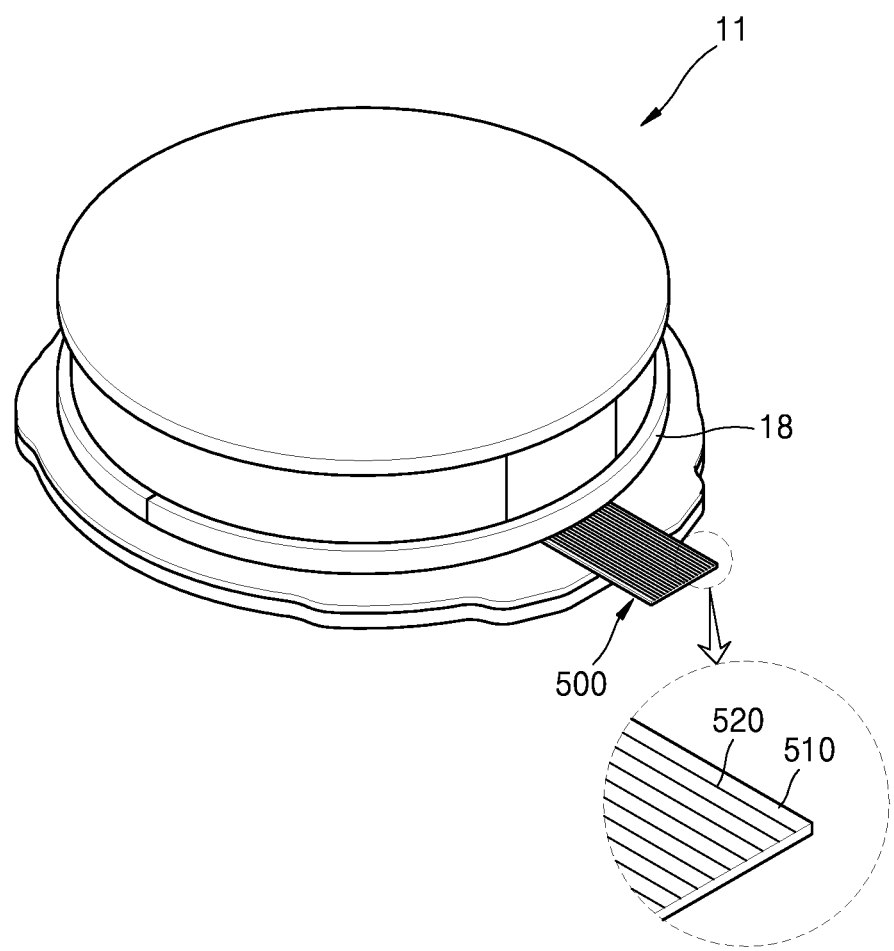
FIG. 3A is a perspective view of a mounting part according to an exemplary embodiment.
Figure 3B:
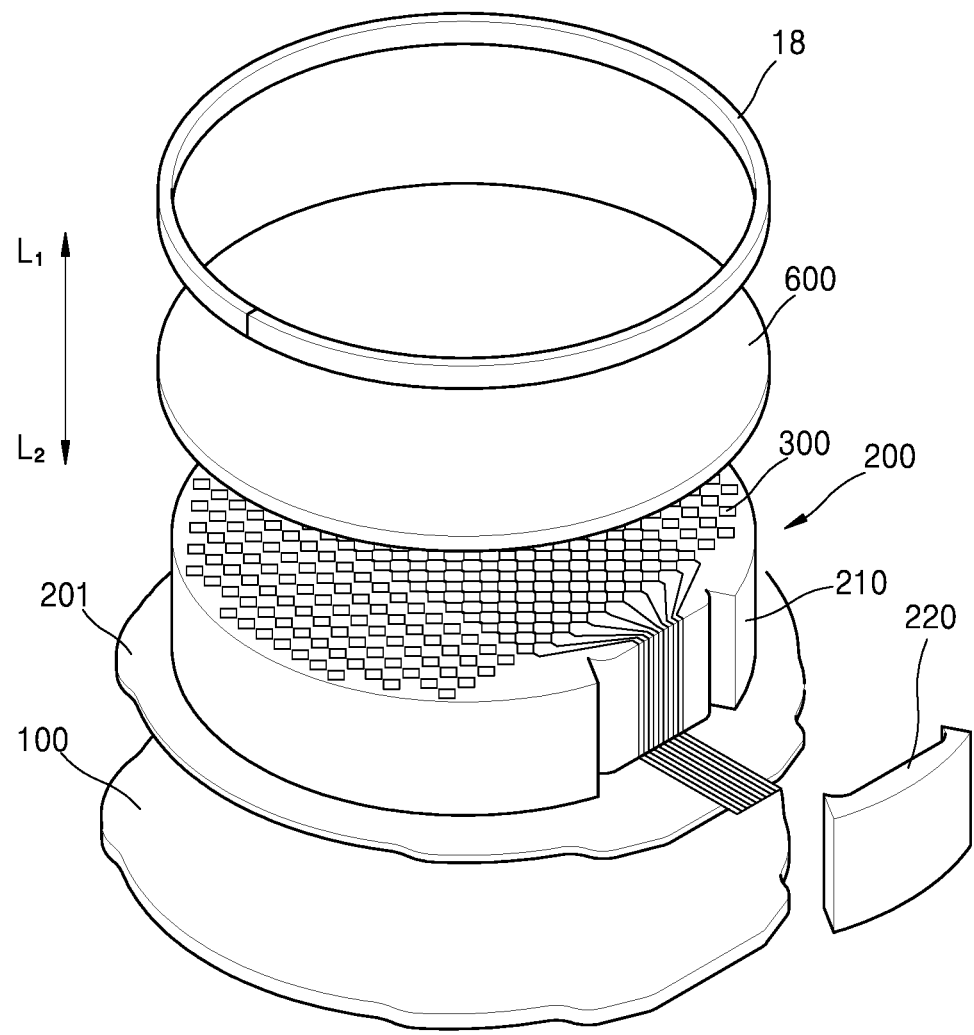
FIG. 3B is an exploded perspective view of a mounting part according to an exemplary embodiment.

FIG. 1 is a perspective view of a wearable device according to an exemplary embodiment. FIG. 2 is an exploded perspective view of a wearable device according to an exemplary embodiment. FIG. 3A is a perspective view of a mounting part according to an exemplary embodiment. FIG. 3B is an exploded perspective view of a mounting part according to an exemplary embodiment.

Referring to FIGS. 1 and 2, the wearable device 1 according to an exemplary embodiment may include a main body part 10 and a strap 20. A pair of straps 20 may be connected to a first side and a second side of the main body part 10, respectively, so as to be worn on the wrist of a user. However, embodiments of the disclosure are not limited thereto. For example, a band-type strap 20 may be formed as one body and have a first end and a second end connected to the main body part 10. The main body part 10 may include a mounting part 11 on which components included in the wearable device 1 are mounted, a case 15 capable of accommodating the mounting part 11 therein, a driving module 16, a bracket 17 capable of supporting the mounting part 11, a waterproof member 18, and a battery 19.

Referring to FIGS. 3A and 3B, the mounting part 11 according to an exemplary embodiment may include a display 100 that displays input/output information, a window member 200 disposed on the display 100, a sensor 300, a flexible connector 500, and a glass cover 600.

The display 100 may be an organic light-emitting display or liquid crystal display capable of displaying images.

The window member 200 may be disposed in front of the display 100. A direction L1 may be defined as a direction in which the display 100 displays an image or a moving picture, and a direction L2 may be defined as a direction opposite to the direction L1. The window member 200 protects the display 100 from external environments. The window member 200 may be transparent and may include, for example but not limited to, tempered glass, sapphire, or polymer. The window member 200 may also include, for example but not limited to, gorilla glass. The window member 200 may supplement the strength and hardness of the glass cover 600 having a relatively small thickness to be described later. To this end, the window member 200 may be thicker than the glass cover 600. For example but not limited to, the thickness of the window member 200 may have a wide range of about 100 μm to about 20 cm.

The window member 200 may have a shape such that a certain strength is secured and at the same time an increase in the thickness or size of the window member 200 is minimized. For example, the window member 200 may have a cylindrical shape to correspond to an external form of the wearable device 1. In this case, the window member 200 may include a base portion 201 that is larger than an insertion hole 1510.

The window member 200 according to an exemplary embodiment is provided so as to be detachable. The window member 200 may include a first window member 210 and a second window member 220 which are coupled to each other such that a surface of the first window member 210 and a surface of the second window member 220 are interlocked with each other. However, embodiments of the disclosure are not limited thereto, and the window member 200 may have any of various other shapes and sizes. Details regarding the window member 200 including the first window member 210 and the second window member 220 will be described later with reference to FIGS. 4A, 4B and 4C.

The sensor 300 may be arranged toward the direction L1 of the window member 200. For example, the sensor 300 may be a touch sensor capable of sensing a touch or non-touch of a user, a fingerprint sensor capable of sensing a fingerprint of a user, or a touch and fingerprint sensor capable of sensing a touch or non-touch of a user and a fingerprint of the user. For example, when the sensor 300 is a capacitance-type sensor, the sensor 300 may recognize a fingerprint of a user by sensing a capacitance change due to a shape of a touched fingerprint. The sensor 300 may sense a capacitance change according to a touch or a non-touch, and thus may also function as a touch sensor that determines a touch or a non-touch of a user.

For example, the sensor 300 may include a first electrode group including a plurality of first electrodes arranged in parallel along a direction, and a second electrode group including a plurality of second electrodes arranged in parallel along a direction intersecting, e.g., perpendicular to, the plurality of first electrodes. In this case, a node at which the plurality of first electrodes and the plurality of second electrodes intersect, respectively, may function as a pixel for sensing a touch input or a fingerprint input.

The flexible connector 500 connects lines included in the sensor 300 to the driving module 16, which is to be described later. Thus, the flexible connector 500 may electrically connect the sensor 300 and the driving module 16, and may transmit electricity between the sensor 300 and the driving module 16. For example, the flexible connector 500 may include connector lines 510 connected with the lines included in the sensor 300, and a flexible support 520 for supporting the connector lines 510. For example, the flexible support 520 may have be a transparent or opaque film including a flexible material. The connector lines 510 may be disposed over the flexible support 520. The flexible connector 500 may be interposed between the first window member 210 and the second window member 220 of the window member 200, so as to extend across the window member 200. Details regarding the flexible connector 500 and the window member 200 will be described in more detail with reference to FIGS. 4A-4C.

The glass cover 600 may be disposed over the sensor 300. The glass cover 600 may be transparent and may include tempered glass, sapphire, or polymer. The glass cover 600 may protect the sensor 300 and may provide an outermost surface of the wearable device 1. Accordingly, the glass cover 600 may have an appropriate strength and appropriate hardness. The glass cover 600 may have a thickness that enables the sensor 300 to maintain an appropriate sensitivity. The glass cover 600 may include a material having a tensile hardness of 9 H or greater. For example but not limited to, the thickness of the glass cover 600 may be about 100 μm or less. For example but not limited to, the glass cover 600 may be joined with the sensor 300 by using an optical clear adhesive (OCA) film.

Referring back to FIGS. 1 and 2, the case 15 may include an upper case 151 and a lower case 152 which are coupled with each other. For example, components of the wearable device 1, such as the display 100, the window member 200, the sensor 300, and the driving module 16, may be accommodated within a space defined by coupling the upper case 151 to the lower case 152. For example, the upper case 151 may include the insertion hole 1510, into which the display 100 and the sensor 300 may be inserted. The upper case 151 surrounds the edge of the waterproof member 18, which is to be described later, to thereby block a foreign material, such as water or dust, which may be introduced from the outside.

The driving module 16 may include a controller electrically connected to the sensor 300 to drive the sensor 300. For example, the driving module 16 may be implemented in a main board form and may be disposed at an area (e.g., the rear) of the display 100. For example, the driving module 16 may include a driving electrode driver that outputs a driving signal and applies the driving signal to a driving electrode unit (or a driving electrode), a shift register for a coarse scan for touch detection, a demultiplexer (DEMUX) for distributing an output of a touch shift register to the driving electrode driver, and a shift register for a fine scan for fingerprint detection.

The waterproof member 18 may be disposed between the upper case 151 and the window member 200 to block a foreign material, such as moisture or dust, which may be introduced from the outside. For example, the waterproof member 18 may be implemented as an O-ring structure disposed to surround the circumference of the window member 200. The waterproof member 18 may include an elastic member. In this case, the waterproof member 18 may have elastic deformation in response to an application of an external force.

The configuration of the wearable device 1 according to an exemplary embodiment is merely an example and may be implemented in configurations other than that illustrated in FIGS. 1-3B. In other words, the wearable device according to an exemplary embodiment may be implemented as including additional elements other than those illustrated in FIGS. 1-3B or removing any one from among elements illustrated in FIGS. 1-3B.

Figure 4A:
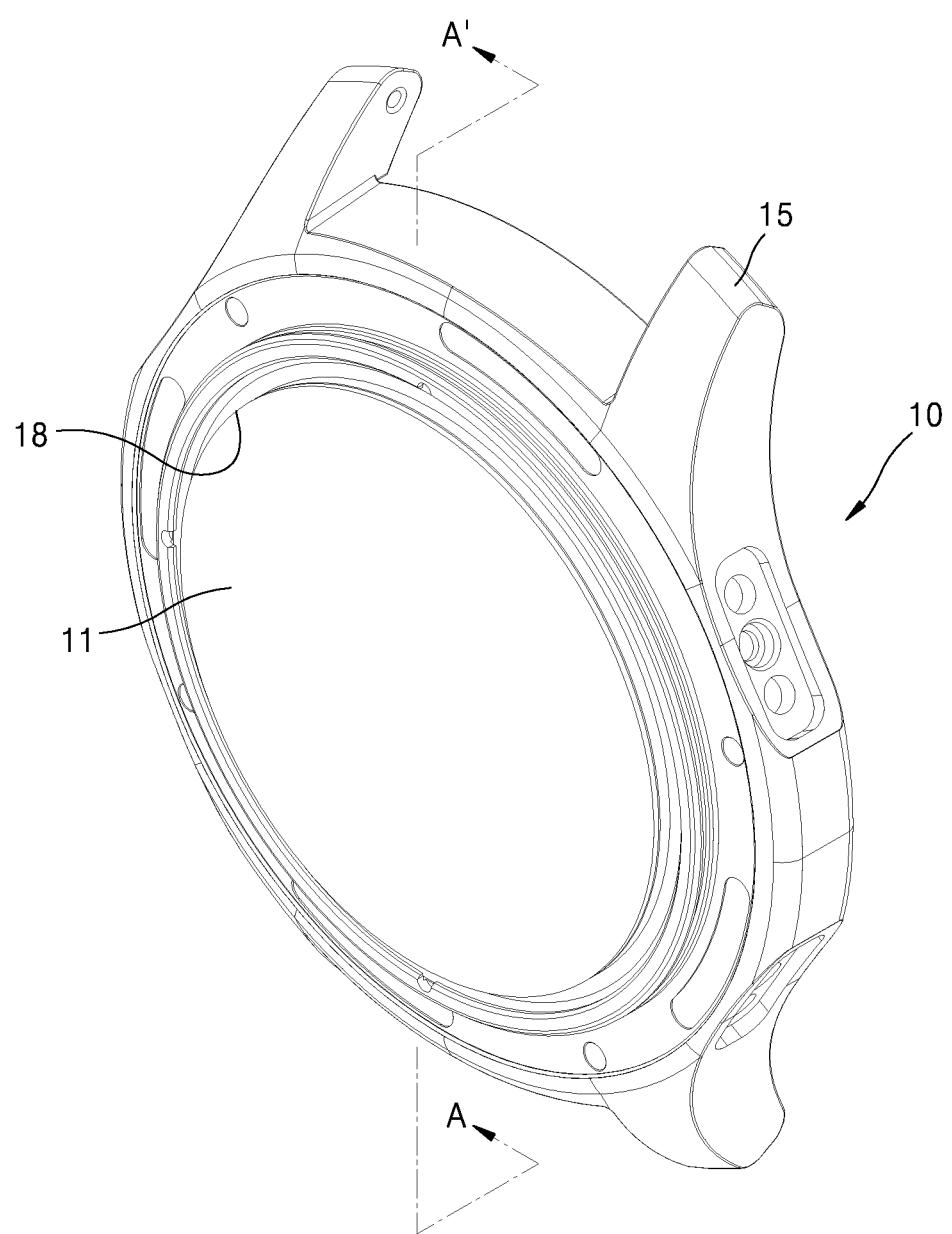
FIG. 4A is a perspective view of a main body part according to an exemplary embodiment.
Figure 4B:
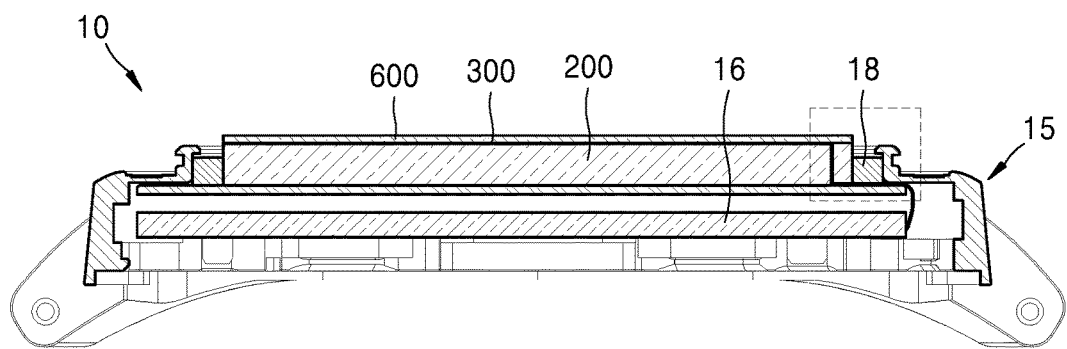
FIG. 4B is a cross-sectional view of a main body part taken along line A-A' of FIG. 4A.
Figure 4C:
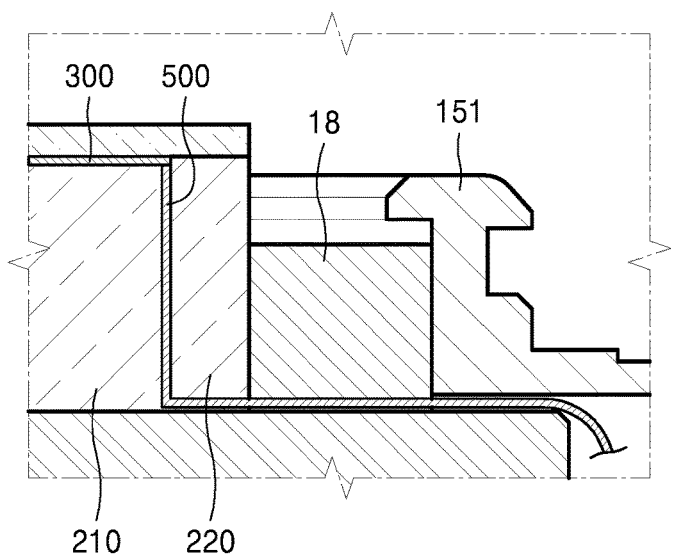
FIG. 4C is a partial magnified view of a portion of FIG. 4B.

FIG. 4A is a perspective view of the main body part 10 according to an exemplary embodiment. FIG. 4B is a cross-sectional view of the main body part 10 taken along line A-A' of FIG. 4A. FIG. 4C is a partial magnified view of a portion of FIG. 4B.

Referring to FIGS. 3A and 3B and FIGS. 4A-4C, the waterproof member 18 according to an exemplary embodiment may be forcedly fit onto the window member 200 including the first window member 210 and the second window member 220. The sensor 300 may be arranged on the window member 200, and the flexible connector 500 connecting the sensor 300 to the driving module 16 may be disposed between the first window member 210 and the second window member 220 and may penetrate through the window member 200. The first window member 210 and the second window member 220 may be arranged to interlock with each other. For example, the window member 200 may be implemented in a cylindrical shape. However, embodiments of the disclosure are not limited thereto, and the window member 200 may be implemented in an arbitrary shape that may correspond to the shape of the waterproof member 18.

For example, the waterproof member 18 having an O-ring shape may be disposed along the sidewall of the window member 200 to thereby surround the circumference of the window member 200. A diameter of the waterproof member 18 may be slightly less than a diameter of the window member 200 such that the waterproof member 18 forcedly fits onto the window member 200. The waterproof member 18 having a circular shape may fit onto the waterproof member 200 having a cylindrical shape and may be supported by the window member 200 to be closely adhered to the sidewall of the window member 200.

As shown in FIGS. 4B and 4C, the flexible connector 500 according to an exemplary embodiment may be arranged to penetrate through the window member 200 and pass below the waterproof member 18. Accordingly, the flexible connector 500 may be connected to the driving module 16 disposed below the flexible connector 500 without directly penetrating through the waterproof member 18. The waterproof member 18 having a circular shape may fit onto the waterproof member 200 having a cylindrical shape and may be supported by the window member 200 to be closely adhered to the sidewall of the window member 200, as described above. The flexible connector 500 may be connected to the driving module 16 disposed below the flexible connector 500 without directly penetrating through the waterproof member 18. Thus, the waterproof member 18 may prevent a space to which water may leak between the flexible connector 500 and the waterproof member 18, and accordingly, may perform waterproof and dustproof functions between the case 15 and the window member 200.

Figure 5A:
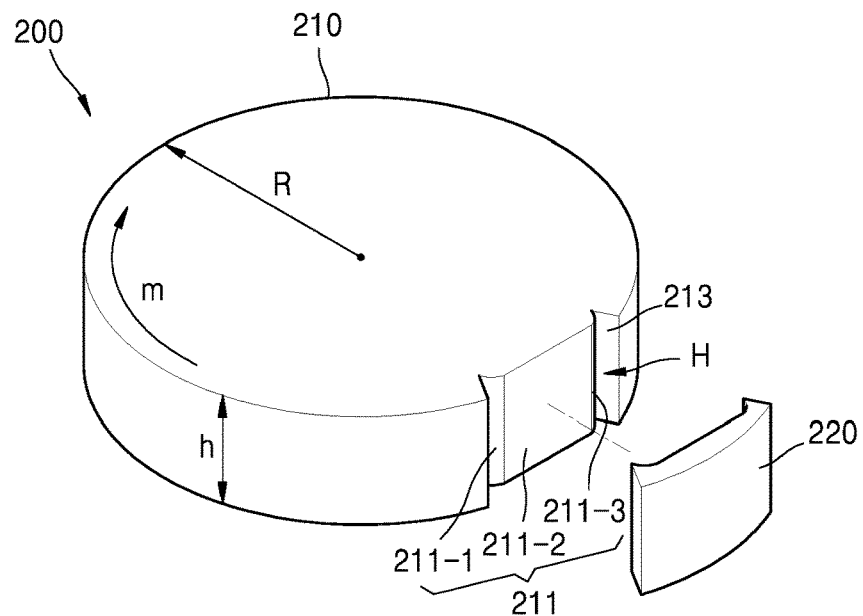
FIG. 5A is a perspective view of a first window member according to an exemplary embodiment.
Figure 5B:
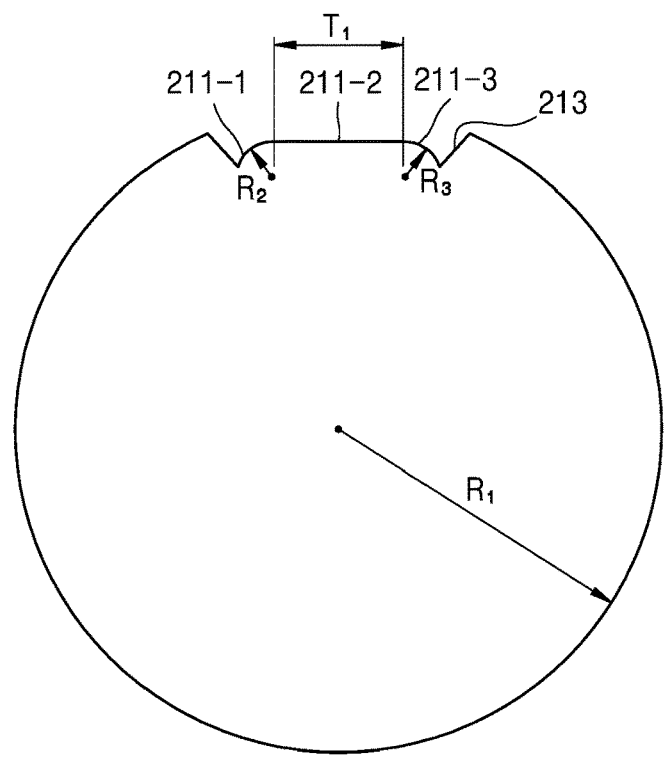
FIG. 5B is a plan view of a first window member according to an exemplary embodiment.
Figure 6A:
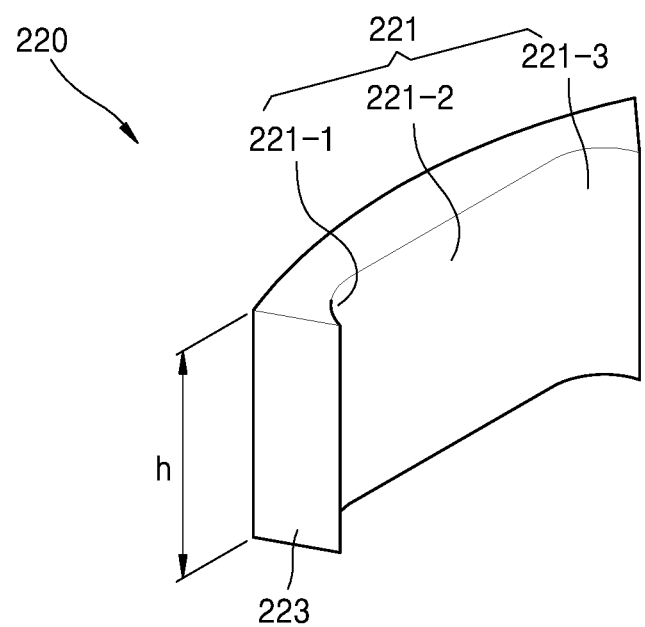
FIG. 6A is a perspective view of a second window member according to an exemplary embodiment.
Figure 6B:
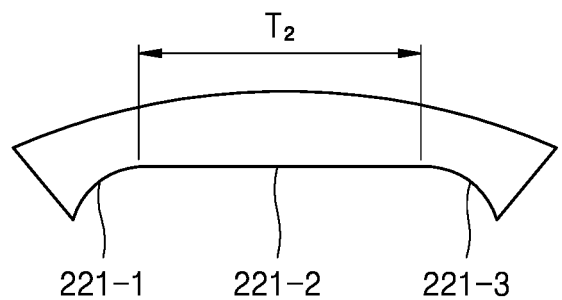
FIG. 6B is a plan view of a second window member according to an exemplary embodiment.

FIG. 5A is a perspective view of the first window member 210 according to an exemplary embodiment. FIG. 5B is a plan view of the first window member 210 according to an exemplary embodiment. FIG. 6A is a perspective view of the second window member 220 according to an exemplary embodiment. FIG. 6B is a plan view of the second window member 220 according to an exemplary embodiment.

Referring to FIGS. 5A and 5B, the first window member 210 according to an exemplary embodiment may have a cylindrical shape. In this case, the first window member 210 may include a bent groove H formed in a lateral portion, for example, on a sidewall of the cylindrical shape of the first window member 210. For example, the second window member 220 may be arranged to interlock with the bent groove H. The window member 200 including the first window member 210 and the second window member 220 may have a cylindrical shape.

The first window member 210 may include a surface 211 facing the second window member 220. The surface 211 may include a first surface 211-1, a second surface 211-2, and a third surface 211-3 extending in one direction. For example, the second surface 211-2 includes a support portion on which the flexible connector 500 may be safely and/or securely seated, and may have a planar form such that the flexible connector 500 having a flat panel form may closely contact and be supported by the second surface 211-2. A width $T_1$ of the second surface 211-2 may be equal to or greater than a width of the flexible connector 500. The second surface 211-2 may include a height h that is equal to that of the sidewall of the window member 200.

The first surface 211-1 and the third surface 211-3 may be disposed on a first side and a second side of the second surface 211-2, respectively. For example, the first surface 211-1 and the third surface 211-3 may be directly supported by a surface 221 (see FIG. 6A) of the second window member 220 and thus may support a pressure load in a radial direction R of the window member 200.

For example, the first surface 211-1 and the third surface 211-3 may be formed to have convex curve shapes. The first surface 211-1 and the third surface 211-3 may be formed to have curvatures different from a curvature of a lateral surface of the window member 200. In this case, a radius of curvature $R_2$ of the first surface 211-1 and a radius of curvature $R_3$ of the third surface 211-3 are different from a radius of curvature $R_1$ of the lateral surface of the window member 200. The first surface 211-1 and the third surface 211-3 may be symmetrical to each other and have the same curvature, or may be asymmetrical to each other and have different curvatures.

However, embodiments of the disclosure are not limited thereto, and the first surface 211-1 and the third surface 211-3 may have an arbitrary shape capable of supporting the pressure load in the radial direction R of the window member 200.

First bent portions 213 may be arranged on a first end and a second end of the surface 211, and may extend in the radial direction of the window member 200. The first bent portions 213 may be arranged to contact second bent portions 223 of the second window member 220, which will be described later, to thereby support a pressure load in a circumferential direction m of the window member 200.

Referring to FIGS. 6A and 6B, the second window member 220 according to an exemplary embodiment may have a shape that may correspond to the bent groove H formed in the lateral portion of the first window member 210, for example, the sidewall of the cylindrical shape of the first window member 210, as described above. For example, when the bent groove H of the first window member 210 is formed by bending one lateral portion of the cylindrical shape of the first window member 210, the second window member 220 may be formed to be coupled with the bent groove H of the first window member 210 to form the cylindrical shape of the window member 200.

The second window member 220 may include the surface 221 disposed to face the first window member 210. The surface 221 may include a fourth surface 221-1, a fifth surface 221-2, and a sixth surface 221-3 extending in one direction. For example, the fifth surface 221-2 may include a support portion that may support the second surface 211-2 of the surface 211 of the first window member 210, and may have a planar shape corresponding to the shape of the second surface 211-2 of the surface 211 of the first window member 210. A width $T_2$ of the fifth surface 221-2 may be equal to the width $T_1$ of the second surface 211-2, and may have a height h equal to that of the second surface 211-2.

The fourth surface 221-1 and the sixth surface 221-3 may be disposed on a first side and a second side of the fifth surface 221-2, respectively. For example, the fourth surface 221-1 and the sixth surface 221-3 may be directly supported by the surface 211 of the first window member 210 and thus may support a pressure load in the radial direction R of the window member 200. For example, the fourth surface 221-1 and the sixth surface 221-3 may be implemented in concave curve shapes, as shown in FIG. 6A. The fourth surface 221-1 and the sixth surface 221-3 may have shapes corresponding to the first surface 211-1 and the third surface 211-3 of FIG. 4A.

The second bent portions 223 may be arranged on a first end and a second end of the surface 221, and may extend in the radial direction of the window member 200. The second bent portions 223 may be arranged to contact the first bent portions 213 of the first window member 210, as described above, to support a pressure load in the circumferential direction m of the first and second window members 210 and 220.

Figure 7:
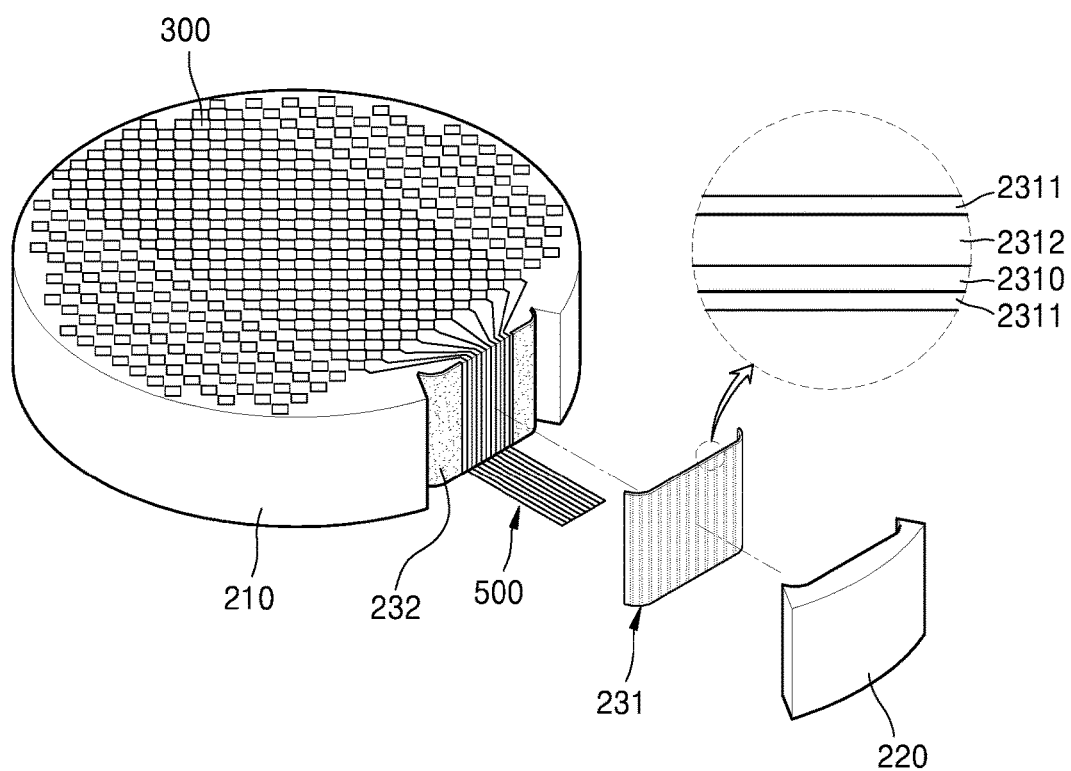
FIG. 7 is an exploded perspective view of a window member according to another exemplary embodiment.

FIG. 7 is an exploded perspective view of a window member according to another exemplary embodiment.

Referring to FIG. 7, a first adhesion film 231 according to an exemplary embodiment may be disposed to cover at least a portion of the flexible connector 500. For example, the first adhesion film 231 may be disposed between the flexible connector 500 and the second window member 220 to attach the first window member 210 to the second window member 220.

For example, the first adhesion film 231 may be a waterproof tape having an adhesion layer on a first surface of the waterproof tape or adhesion layers on the first surface and a second surface of the waterproof tape. For example, the first adhesion film 231 may include a base layer 2310, and an adhesion layer 2311 or adhesion layers 2311 may be formed on a first surface or formed on the first surface and a second surface of the base layer 2310, respectively, to thereby attach the first window member 210 to the second window member 220. The first adhesion film 231 may have a thickness of, for example but not limited to, 10 to 300 μm, to facilitate secure adhesion with adherents, namely, the first window member 210 and the second window member 220. By setting the thickness of the first adhesion film 231 as such, the first adhesion film 231 may easily apply to thin and small wearable devices and electronic apparatuses, and may increase adhesiveness and provide improved waterproof function. However, the thickness of the first adhesion film 231 is not limited to this example.

The first adhesion film 231 may further include a cushion layer 2312 to improve the adhesion with the first window member 210 and the second window member 220. The cushion layer 2312 according to an exemplary embodiment may use foams or may use a filler layer including an impact-resistant filler. By changing the shape of the cushion layer 2312, a gap between the first window member 210 and the second window member 220 can be filled.

A second adhesion film 232 according to an exemplary embodiment may be disposed between the flexible connector 500 and the first window member 210 to attach the first window member 210, the flexible connector 500, and the second window member 220 to each other. A structure of the second adhesion film 232 is substantially the same as that of the first adhesion film 231, and thus descriptions thereof will be omitted herein.

One of the first adhesion film 231 and the second adhesion film 232 may be used, or both of the first adhesion film 231 and the second adhesion film 232 may be used.

Figure 8A:
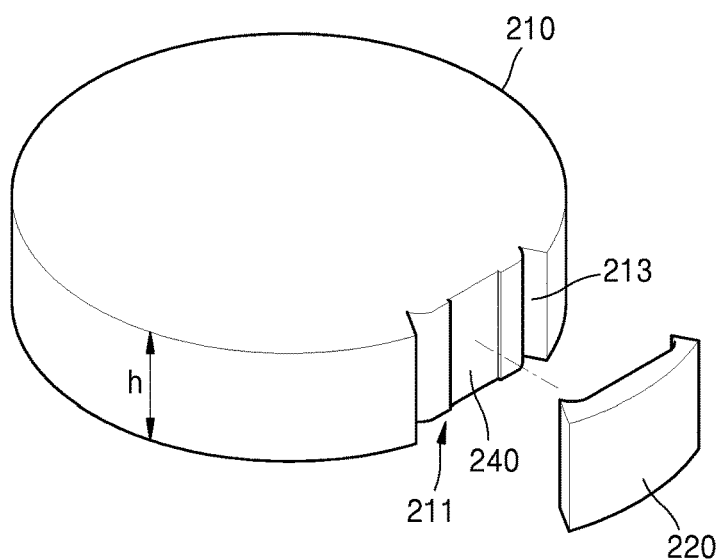
FIG. 8A is a perspective view of a first window member according to another exemplary embodiment.
Figure 8B:
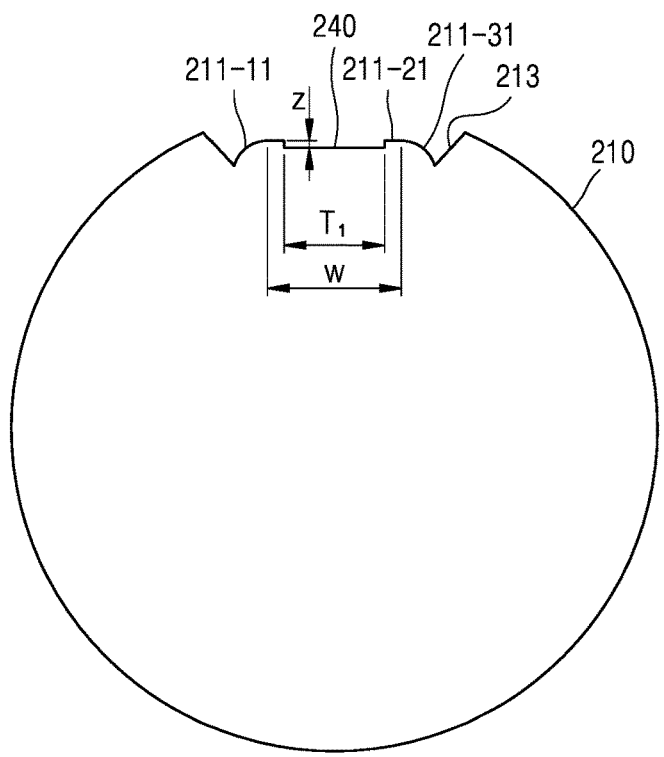
FIG. 8B is a plan view of a first window member according to another exemplary embodiment.
Figure 9A:
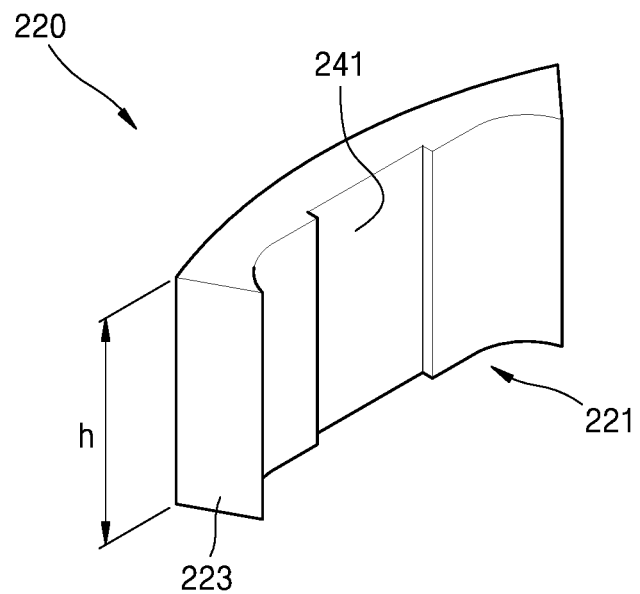
FIG. 9A is a perspective view of a second window member according to another exemplary embodiment.
Figure 9B:
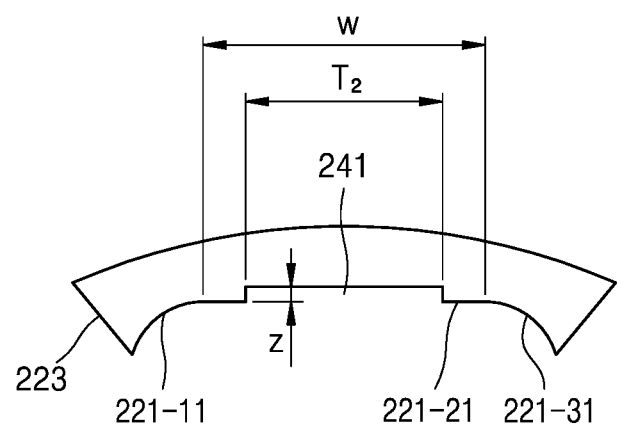
FIG. 9B is a plan view of a second window member according to another exemplary embodiment.

FIG. 8A is a perspective view of a first window member 210 according to another exemplary embodiment. FIG. 8B is a plan view of the first window member 210 according to another exemplary embodiment. FIG. 9A is a perspective view of a second window member 220 according to another exemplary embodiment. FIG. 9B is a plan view of the second window member 220 according to another exemplary embodiment.

Referring to FIGS. 8A and 8B, a groove 240 may be formed on the surface 211 of the first window member 210 according to an exemplary embodiment. For example, the surface 211 may include a seventh surface 211-11, an eighth surface 211-21, and a ninth surface 211-31 extending in one direction. The eighth surface 211-21 may include a support portion on which the flexible connector 500 may be safely and/or securely seated, and may have a planar form such that the flexible connector 500 having a flat panel form may closely contact and be supported by the eighth surface 211-21. In this case, the eighth surface 211-21 may include the groove 240 on which the flexible connector 500 may be safely seated. For example, a width $T_1$ of the groove 240 may be equal to or greater than a width of the flexible connector 500. The width $T_1$ of the groove 240 may be smaller than a width w of the eighth surface 211-21. A thickness Z of the groove 240 may be equal to or greater than a thickness of the flexible connector 500. The groove 240 may have a height h that is equal to that of the sidewall of the window member 200. According to another exemplary embodiment, the groove 240 on which the flexible connector 500 is seated may be formed on the second window member 220.

Referring to FIGS. 9A and 9B, a groove 241 may be formed on the surface 221 of the second window member 220 according to an exemplary embodiment. For example, the surface 221 may include a tenth surface 221-11, an eleventh surface 221-21, and a twelfth surface 221-31 extending in one direction. In this case, the eleventh surface 221-21 may include the groove 241 on which the flexible connector 500 may be safely and/or securely seated. For example, a width $T_2$ of the groove 241 may be equal to or greater than the width of the flexible connector 500. The width $T_2$ of the groove 241 may be smaller than a width w of the eleventh surface 221-21. A thickness Z of the groove 241 may be equal to or greater than the thickness of the flexible connector 500. The groove 241 may have a height h that is equal to that of the sidewall of the window member 200. As described above, the grooves 240 and 241 may be formed on one of the first window member 210 and the second window member 220, and, as the flexible connector 500 is arranged on the groove 240 or the groove 241, the thickness of the flexible connector 500 may prevent a space to which water may leak from being formed between the eighth or eleventh surface 211-21 or 221-21 and the flexible connector 500.

Figure 10:
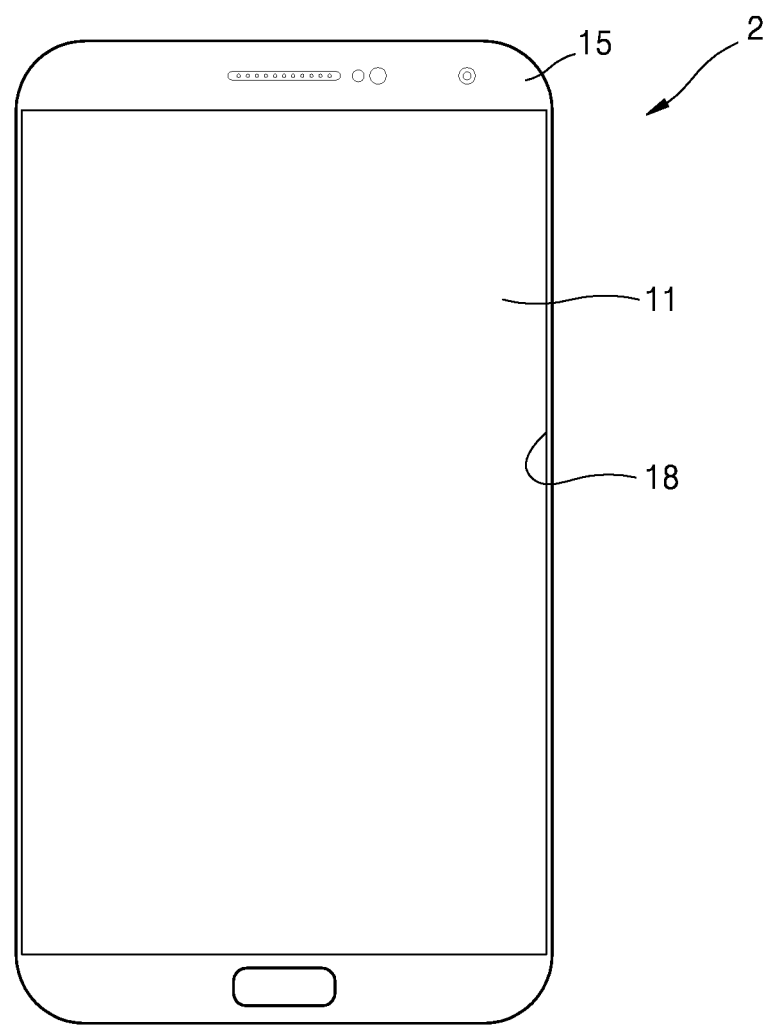
FIG. 10 is a perspective view of an electronic apparatus according to an exemplary embodiment.
Figure 11:
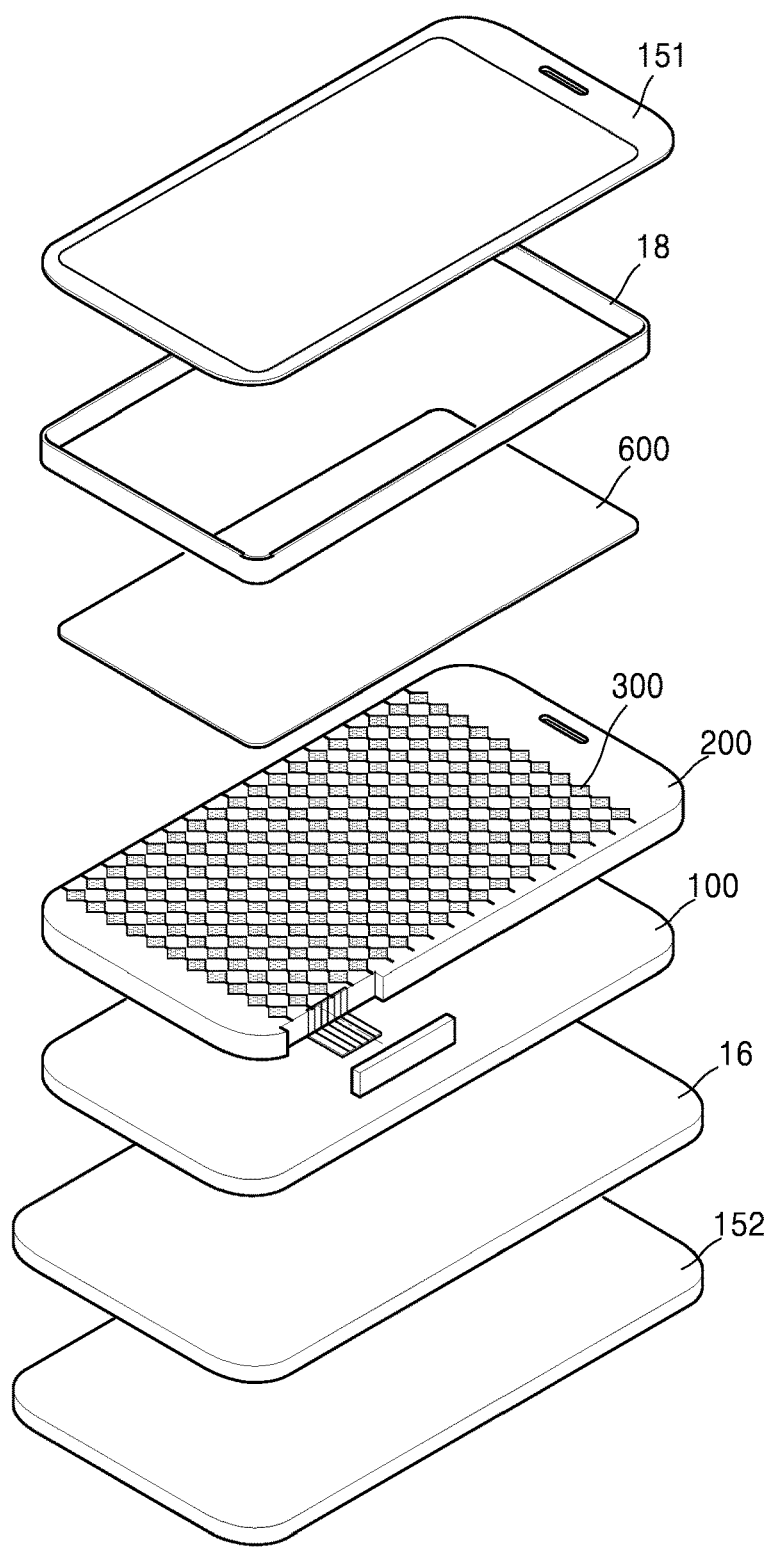
FIG. 11 is an exploded perspective view of an electronic apparatus according to an exemplary embodiment.
Figure 12:
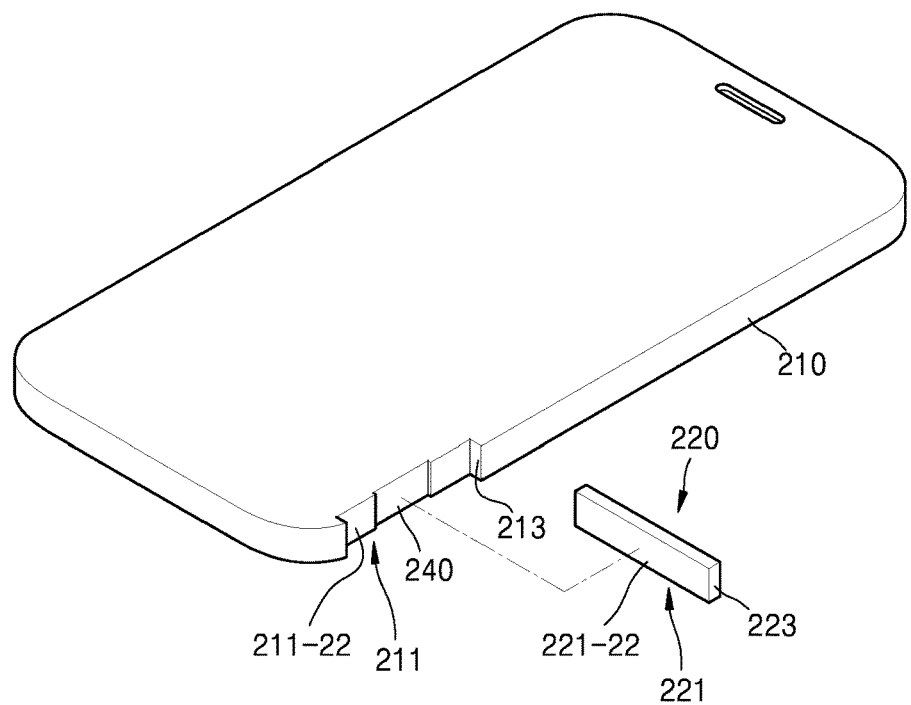
FIG. 12 is an exploded perspective view of a window member included in an electronic apparatus according to an exemplary embodiment.

FIG. 10 is a perspective view of an electronic apparatus according to an exemplary embodiment. FIG. 11 is an exploded perspective view of a mounting part and a waterproof member according to another exemplary embodiment. FIG. 12 is an exploded perspective view of a window member included in an electronic apparatus according to an exemplary embodiment.

In the disclosure, for illustrative purposes, a smartphone is used as an example of an electronic apparatus according to another exemplary embodiment. However, embodiments of the disclosure are not limited thereto, and an electronic apparatus according to another exemplary embodiment may be a mobile phone, a personal digital assistant (PDA), a portable multimedia player (PMP), a tablet personal computer (PC), or the like. For convenience of explanation, descriptions of a structure that is substantially the same as that of the wearable device 1 will not be given.

Referring to FIGS. 10-12, an electronic apparatus 2 according to another exemplary embodiment may include a mounting part 11 including components included in the electronic apparatus 2, a case 15 including an upper case 151 and a lower case 152 capable of accommodating the mounting part 11 therein, a driving module 16, and a waterproof member 18. The mounting part 11 according to an exemplary embodiment may include a display 100 for displaying input/output information, a window member 200 disposed on the display 100, a sensor 300, a flexible connector 500, and a glass cover 600.

The window member 200 according to an exemplary embodiment may have a square pole (or hexahedral) shape including a first window member 210 having a bent groove in one lateral portion thereof and a second window member 220, and the waterproof member 18 may have a shape corresponding to the shape of the window member 200. The waterproof member 18 may be disposed between the upper case 151 and the window member 200 including the first window member 210 and the second window member 220.

In more detail, referring to FIG. 12, the first window member 210 may include the bent groove in one lateral portion thereof, and may have a surface 211 that faces the second window member 220. The surface 211 may include a thirteenth surface 211-22 extending in one direction. For example, the thirteenth surface 211-22 includes a support portion on which the flexible connector 500 may be safely and/or securely seated, and may have a planar form such that the flexible connector 500 having a flat panel form may closely contact and be supported by the thirteenth surface 211-22.

First bent portions 213 may be arranged on a first end and a second end of the surface 211, and may extend in one direction of the window member 200. The first bent portions 213 may be arranged to contact second bent portions 223 of the second window member 220, which will be described later, to support a pressure load in a length direction of the window member 200.

The second window member 220 may include a surface 221 facing the first window member 210. The surface 221 may include a fourteenth surface 221-22 extending in one direction. For example, the fourteenth surface 221-22 includes a support portion on which the flexible connector 500 may be safely and/or securely seated, and may have a planar form such that the flexible connector 500 having a flat panel form may closely contact and be supported by the fourteenth surface 221-22.

As described above, a groove 240 according to an exemplary embodiment may be formed on one of the first window member 210 and the second window member 220, and, as the flexible connector 500 is arranged on the groove 240 or the groove 241, the thickness of the flexible connector 500 may prevent a space to which water may leak from being formed between the thirteenth or fourteenth surface 211-22 or 221-22 and the flexible connector 500.

As described above, the flexible connector 500 may be arranged to penetrate through the window member 200 and pass below the waterproof member 18. Accordingly, the flexible connector 500 may be connected to the driving module 16 disposed below the flexible connector 500 without directly penetrating through the waterproof member 18.

The waterproof member 18 according to an exemplary embodiment may fit onto the waterproof member 200 having a square pole shape and may be supported by the window member 200 to be closely adhered to the sidewall of the window member 200. Further, the flexible connector 500 may be connected to the driving module 16 disposed below the flexible connector 500 without directly penetrating through the waterproof member 18. Thus, the waterproof member 18 may prevent a space to which water may leak from being formed between the flexible connector 500 and the waterproof member 18, and may perform waterproof and/or dustproof functions between the case 15 and the window member 200.

Figure 13:
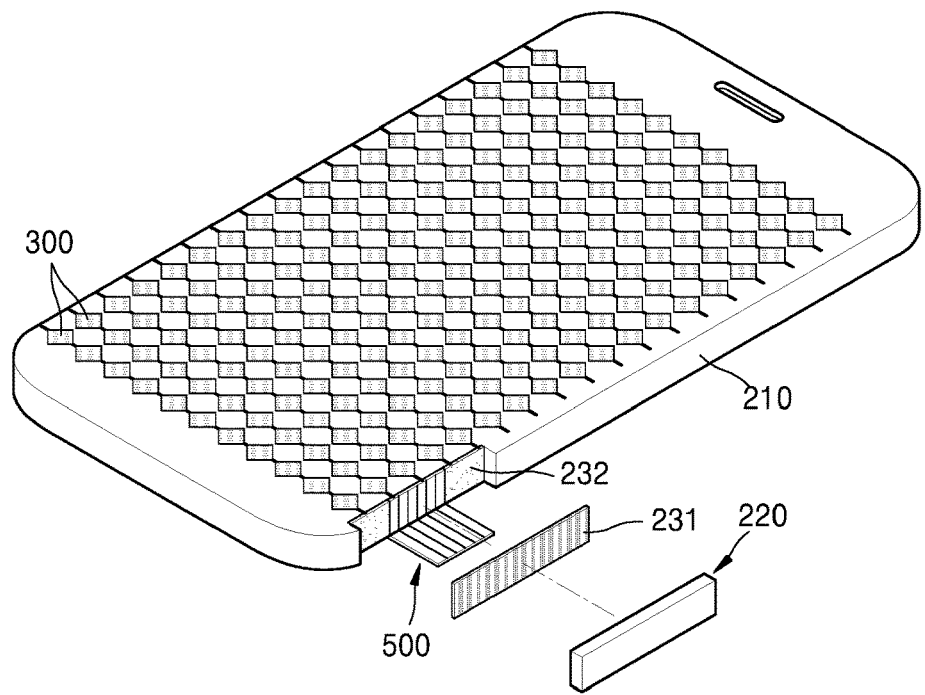
FIG. 13 is an exploded perspective view of a window member included in an electronic apparatus according to another exemplary embodiment.

FIG. 13 is an exploded perspective view of a window member 200 included in an electronic apparatus according to another exemplary embodiment.

Referring to FIG. 13, a first adhesion film 231 according to an exemplary embodiment may be disposed to cover at least a part of the flexible connector 500. For example, the first adhesion film 231 may be disposed between the flexible connector 500 and the second window member 220 to attach the first window member 210 to the second window member 220. A second adhesion film 232 according to an exemplary embodiment may be disposed between the flexible connector 500 and the first window member 210 to attach the first window member 210, the flexible connector 500, and the second window member 220 to each other.

According to an exemplary embodiment of the disclosure, a flexible connector is disposed between a first window member and a second window member of a window member, and thus a space to which water may leak may be prevented from being created between the flexible connector and a waterproof member supported by the window member, and consequently an improved waterproof effect may be obtained.

Although a wearable device and an electronic apparatus according to the inventive concept have been described above with reference to the embodiments illustrated in the drawings, the illustrated embodiments are only examples, and various modifications to the illustrated embodiments and other equivalent embodiments may be possible. It should be understood that embodiments described herein should be considered in a descriptive sense only and not for purposes of limitation. The scope of the inventive concept is defined not by the detailed description of the inventive concept but by the appended claims, and all differences within the scope will be construed as being included in the inventive concept.

What is claimed is:

1. A wearable device that is wearable by a user, the wearable device comprising:
    a display;
    a window member disposed on or above the display in a first direction, the window member comprising a first window member, and a second window member configured to interlock with a first groove formed on a lateral portion of the first window member;
    a sensor disposed on or above the window member in the first direction;
    a driving module disposed on or below the display in the first direction;
    a flexible connector, disposed between the first window member and the second window member, and configured to electrically connect the sensor and the driving module;
    a waterproof member surrounding an edge portion of the window member and being elastically deformable;
    a case comprising an insertion hole into which the sensor and the display are insertable; and
    at least one strap connected to the case.

2. The wearable device of claim 1, wherein the first window member and the second window member interlock with each other and form a cylindrical shape.

3. The wearable device of claim 2, wherein a surface of the lateral portion of the first window member facing the second window member comprises a first surface having a curved form, a second surface having a planar form, and a third surface having the curved form, the second surface being between the first surface and the third surface.

4. The wearable device of claim 3, wherein the lateral portion of the first window member further comprises a first bent portion and a second bent portion extending in a radial direction of the first window member, and the first groove comprises a first bent groove formed by the first bent portion and the first surface and a second bent groove formed by the second bent portion and the third surface.

5. The wearable device of claim 3, wherein a second groove is formed on the second surface and the flexible connector is seated on the second groove.

6. The wearable device of claim 3, wherein a surface of the second window member facing the surface of the first window member comprises a fourth surface having the curved form, a fifth surface having the planar form, and a sixth surface having the curved form.

7. The wearable device of claim 6, wherein the second window member further comprises a third bent portion and a fourth bent portion extending in a radial direction of the first window member, and the first groove comprises a third bent groove formed by the third bent portion and the fourth surface and a fourth bent groove formed by the fourth bent portion and the sixth surface.

8. The wearable device of claim 6, wherein a second groove is formed on the fifth surface and the flexible connector is seated on the second groove.

9. The wearable device of claim 1, wherein the sensor comprises at least one from among a fingerprint sensor, a touch sensor, and a touch and fingerprint sensor.

10. The wearable device of claim 1, further comprising a first adhesive film between the second window member and the flexible connector.

11. The wearable device of claim 1, further comprising a second adhesive film between the first window member and the flexible connector.

12. The wearable device of claim 1, wherein the case is configured to surround an edge portion of the waterproof member, and accommodate the driving module, the display, the sensor, the first window member, and the second window member.

13. The wearable device of claim 1, further comprising a glass cover disposed on or over the sensor.

14. An electronic apparatus comprising:
a display;
a window member disposed on or above the display in a first direction, the window member comprising a first window member, and a second window member configured to interlock with a first groove formed on a lateral portion of the first window member;
a sensor disposed on or above the window member in the first direction;
a driving module disposed on or below the display in the first direction;
a flexible connector disposed between the first window member and the second window member, and configured to electrically connect between the sensor and the driving module; and
a waterproof member configured to surround an edge portion of the window member and being elastically deformable.

15. The electronic apparatus of claim 14, wherein a surface of the first window member facing the second window member comprises a first surface having a planar form and extending in the first direction.

16. The electronic apparatus of claim 15, wherein a second groove is formed on the first surface and the flexible connector is seated on the second groove.

17. The electronic apparatus of claim 15, wherein a surface of the second window member facing the surface of the first window member comprises a second surface having the planar form and extending in the first direction.

18. The electronic apparatus of claim 17, wherein a second groove is formed on the second surface and the flexible connector is seated on the second groove.

19. The electronic apparatus of claim 14, further comprising a first adhesion film between the second window member and the flexible connector.

20. The electronic apparatus of claim 14, further comprising a second adhesion film between the first window member and the flexible connector.

21. An electronic apparatus, comprising:
a display;
a window member disposed on or above the display in a first direction, the window member comprising a first window member, and a second window member that is interlocked with a first groove formed on a lateral portion of the first window member;
a sensor disposed on or above the window member in the first direction;
a driving module configured to drive the sensor, and disposed on or below the display in the first direction;
a flexible connector, disposed between the first window member and the second window member in the lateral direction of the first window member, and configured to electrically connect the sensor and the driving module;
a waterproof member configured to surround an edge portion of the window member.

* * * * *